United States Patent
Suen et al.

(12) 
(10) Patent No.: US 9,023,946 B2
(45) Date of Patent: May 5, 2015

(54) MOISTURE CURE HOT MELT ADHESIVES

(75) Inventors: Wu Suen, Flemington, NJ (US); Charles Paul, Madison, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 203 days.

(21) Appl. No.: 13/530,565

(22) Filed: Jun. 22, 2012

(65) Prior Publication Data

US 2012/0322926 A1 Dec. 20, 2012

Related U.S. Application Data

(63) Continuation of application No. PCT/US2010/061207, filed on Dec. 20, 2010.

(60) Provisional application No. 61/288,911, filed on Dec. 22, 2009.

(51) Int. Cl.

| C08L 101/10 | (2006.01) |
|---|---|
| C09J 143/04 | (2006.01) |
| C09J 193/04 | (2006.01) |
| C09J 201/10 | (2006.01) |

(52) U.S. Cl.
CPC .............. *C09J 143/04* (2013.01); *C08L 101/10* (2013.01); *C08K 2201/019* (2013.01); *C09J 193/04* (2013.01); *C09J 201/10* (2013.01)

(58) Field of Classification Search
USPC .......................................................... 525/10
See application file for complete search history.

(56) References Cited

U.S. PATENT DOCUMENTS

| 4,593,068 A | 6/1986 | Hirosu et al. |
|---|---|---|
| 4,783,504 A | 11/1988 | St. Clair et al. |
| 5,097,053 A | 3/1992 | Baghdachi et al. |
| 5,210,150 A | 5/1993 | Prejean |
| 5,331,049 A | 7/1994 | Audett et al. |
| 5,346,939 A | 9/1994 | Moren et al. |
| 5,669,940 A | 9/1997 | Stubbs |
| 6,121,354 A | 9/2000 | Chronister |
| 6,204,350 B1 | 3/2001 | Liu et al. |
| 6,303,731 B1 | 10/2001 | Carlson et al. |
| 6,350,345 B1 | 2/2002 | Kotani et al. |
| 6,433,055 B1 | 8/2002 | Kleye et al. |
| 6,437,071 B1 | 8/2002 | Odaka et al. |
| 6,437,072 B1 | 8/2002 | Jyono et al. |
| 6,444,775 B1 | 9/2002 | Jyono et al. |
| 6,613,816 B2 | 9/2003 | Mahdi et al. |
| 6,642,309 B2 | 11/2003 | Komitsu et al. |
| 6,649,016 B2 | 11/2003 | Wu et al. |
| 6,664,323 B2 | 12/2003 | Lucas |
| 6,749,943 B1 | 6/2004 | Tangen et al. |
| 6,777,485 B1 | 8/2004 | Ito et al. |
| 6,803,412 B2 | 10/2004 | Nguyen-Misra et al. |
| 6,828,403 B2 | 12/2004 | Mahdi et al. |
| 6,967,226 B2 | 11/2005 | Shah |
| 7,067,563 B2 | 6/2006 | Klein et al. |
| 7,087,127 B2 | 8/2006 | Mahdi et al. |
| 7,091,298 B2 | 8/2006 | Schindler et al. |
| 7,153,911 B2 | 12/2006 | Yano et al. |
| 2002/0084030 A1 | 7/2002 | Kotani et al. |
| 2004/0180155 A1* | 9/2004 | Nguyen-Misra et al. ....... 428/34 |
| 2005/0043455 A1 | 2/2005 | Hohner et al. |
| 2005/0215702 A1 | 9/2005 | Slark et al. |
| 2006/0142532 A1 | 6/2006 | Wintermantel et al. |
| 2008/0125539 A1 | 5/2008 | Mack |
| 2009/0005498 A1 | 1/2009 | Lin et al. |
| 2009/0105407 A1 | 4/2009 | Karjala et al. |
| 2009/0226740 A1 | 9/2009 | Teysseire |

FOREIGN PATENT DOCUMENTS

| DE | 102004055450 | 5/2006 |
|---|---|---|
| EP | 0310704 | 6/1994 |
| GB | 2197326 | 5/1988 |
| GB | 2292154 | 2/1996 |
| JP | 60235747 | 11/1985 |
| JP | 1163281 | 12/1987 |
| JP | 1301740 | 12/1989 |
| JP | 2150488 | 6/1990 |
| JP | 10251357 | 9/1998 |
| JP | 3030020 | 6/2000 |
| JP | 3621678 | 9/2003 |
| JP | 4176028 | 6/2004 |
| WO | 8911506 | 11/1989 |
| WO | 8911514 | 11/1989 |
| WO | 9106580 | 5/1991 |
| WO | 9108240 | 6/1991 |
| WO | 2006028927 | 3/2006 |
| WO | 2007122261 | 11/2007 |
| WO | 2008116033 | 9/2008 |
| WO | 2010033383 | 3/2010 |

OTHER PUBLICATIONS

BASF(http://www.basf.com/group/corporate/en/brand/DISPEX)(Date unknown).*
International Search Report issued in connection with International Patent Application No. PCT/US2010/061207 mailed Aug. 31, 2011.
International Search Report for PCT/US2008/072590.

* cited by examiner

*Primary Examiner* — Kuo-Liang Peng
(74) *Attorney, Agent, or Firm* — James E. Piotrowski

(57) ABSTRACT

The present invention relates to new improved adhesives for binding books and related articles and the production of such adhesives. In particular, the adhesives have reduced content of monomeric diisocyanates or no monomeric diisocyanate content.

19 Claims, No Drawings

MOISTURE CURE HOT MELT ADHESIVES

FIELD OF THE INVENTION

This invention relates to adhesives that do not emit monomeric diisocyanate, their use and production.

BACKGROUND OF THE INVENTION

Conventional reactive polyurethane hot melt adhesive are utilized in packaging, paper converting, paper construction, bookbinding, cartons, case sealing, construction, automotive, and the like. The reactive polyurethane hot melt adhesives create a very durable product and are particularly useful in the manufacture of packages and textbooks.

Conventional reactive polyurethane hot melt adhesives are moisture-curing or moisture-crosslinking adhesives that are solids at room temperature, but they are applied in the form of a melt. The polymeric constituents of the adhesives contain urethane groups and reactive isocyanate groups. Cooling of the melt results first in rapid physical setting of the hot melt adhesive followed by the chemical reaction of the isocyanate groups still present with moisture from the environment to form a crosslinked infusible adhesive.

Conventional reactive polyurethane hot melt adhesives have certain disadvantages inherent in the system. One of the most serious of these is the residual monomer content of polyisocyanates, more particularly the more volatile diisocyanates. Hot melt adhesives are typically applied at elevated temperatures, for example, at 100° to 170° C. After their application, they rapidly build up a high adhesive strength by cooling and acquire their final properties, in particular their heat distortion resistance and resistance to environmental influences, by the post crosslinking of the polyurethane polymer as a result of reaction of the isocyanate groups with moisture. The conventional reactive hot melt adhesive generally contain significant amounts of unreacted monomeric diisocyanates which are partly expelled in gaseous form at the application temperatures of 85° C. to 200° C., typically 120° C. to 160° C., which are usual in the case of hot melt adhesives. At such temperatures ranges, monomeric diisocyanates have a considerable vapor pressure. The isocyanate vapors formed are toxic as well as irritating and sensitizing effect, so that precautionary measures have to be taken to prevent damage to the health of personnel involved in the application process. These measures, including for example the obligation to ensure that the maximum allowable concentration (MAC) is not exceeded, extraction of the vapors at the point of formation and elimination, are highly cost-intensive. The MAC Commission has even classified various monomeric isocyanates in Category 3 "Substances with Well-Founded Suspicion of Carcinogenic Potential" of Section III (Carcinogenic Workplace Substances) of the MAC List. The Trade Association of the German Chemical Industry published a special code of practice entitled "Polyurethane Production and Processing/Isocyanates" with information on the safe handling of isocyanates. According to this publication, the handling of monomeric diisocyanates and compositions that contain monomeric diisocyanates requires special care, and according to the provisions of the Hazardous Substances Act, monomeric diisocyanates and compositions that contain diisocyanates must be labeled accordingly. However, when the content of monomeric diisocyanates in the composition is very low (less than 0.1 wt. %), there may no longer be an obligation to provide hazardous substance labeling.

Accordingly, the development of reactive polyurethane compositions with a drastically reduced content of monomeric diisocyanates or no monomeric diisocyante content is highly desirable for packaging bookbinding adhesives.

BRIEF SUMMARY OF THE INVENTION

It has been discovered that certain reactive hot melt adhesives can be produced which emit low or zero monomeric disocyante (MDI) content. The resulting reactive hot melt adhesives have similar or superior performance than the conventional reactive hot melt adhesive, and are advantageously used in packaging and/or bookbinding.

One embodiment of the invention is directed to a non-MDI emitting reactive hot melt adhesive comprising a high modulus silane modified liquid polymer, a tackifier and a catalyst. The cured film of high modulus silane modified liquid polymer has a Young's modulus greater than 50 psi.

In another embodiment, the non-MDI emitting reactive hot melt adhesive comprises a high modulus silane modified liquid polymer; a low modulus silane modified liquid polymer, a rosin ester tackifier, an aromatic hydrocarbon tackifier, and a catalyst. The cured film of high modulus silane modified liquid polymer has a Young's modulus greater than 50 psi, and the cured film of low modulus silane modified liquid polymer has a Young's modulus less than 50 psi.

In another embodiment, the ratio of the high modulus silane modified liquid polymer to the low modulus silane modified liquid polymer is from about 0.3 to about 3.0.

Yet in another embodiment, the ratio of the rosin ester tackifier to the aromatic tackifier in the reactive hot melt adhesive is from about 0.05 to about 5.0.

In a further embodiment, the non-MDI emitting reactive hot melt adhesive comprises from about 10 wt % to about 30 wt % of a high modulus silane modified liquid polymer, from about 10 wt % to about 30 wt % of a low modulus silane modified liquid polymer, from about 5 wt % to about 20 wt % of a rosin ester tackifier, from about 15 wt % to about 40 wt % of an aromatic tackifier, 0.05 wt % to about 5 wt % of a catalyst, based on the total weight of the adhesive.

Another embodiment of the invention is directed to a method of applying a non-MDI emitting adhesive comprising applying the adhesive to a first substrate, bringing a second substrate in contact with the adhesive applied to the first substrate, and subjecting the applied adhesive to cure and form a set bond, wherein the adhesive comprises a high modulus silane modified liquid polymer, low modulus silane modified liquid polymer, a rosin ester tackifier, an aromatic tackifier and a catalyst.

A further embodiment of the invention is directed to an article of manufacture prepared using a non-MDI emitting reactive hot melt adhesive comprising high modulus silane modified liquid polymer, low modulus silane modified liquid polymer, a rosin ester tackifier, an aromatic tackifier and a catalyst.

DETAILED DESCRIPTION OF THE INVENTION

This invention relates to adhesives used in packaging, paper converting, paper construction, bookbinding, cartons, case sealing, their use, and production. For purposes of convenience for bookbinding adhesives, the word "bookbinding" will be used to describe the process by which books are produced, including perfect binding and traditional process, and spine gluing or side gluing (hinge gluing). However, this invention is not limited to adhesives suitable for binding only books. As used herein the term "books" is intended to include other articles containing pages bound with adhesives such as paperback books, soft cover books, instruction manuals, magazines, catalogs, trade journals, directories, and the like.

The disclosures of all documents cited herein are incorporated in their entireties by reference.

As used herein, "irreversible solid form" means a solid form wherein the silane modified polymer in the adhesive has reacted with moisture and itself to produce an insoluble siloxane linked material.

The composition of the invention is prepared using a high modulus silane modified liquid polymer with a tackifier and a catalyst.

The high modulus silane modified liquid polymer has an organic backbone, bearing one or more terminal or pendant silane or alkoxylated silane groups. The silane groups are hydrolyzed by water to silanol groups, which can condense with each other or with reactive species on the adherent surfaces. The high modulus silane modified liquid polymer of the present invention may be prepared with a variety of polymer backbones such as polyurethane (derived from Baycoll 2458 from Bayer), polyether, polyester, polyetherester, polyesterether, polyolefin, polycaprolactone, polyacrylate, polybutadiene, polycarbonates, polyacetals, polyester amides and polythioethers, polyolefin and the like. One preferred backbone for the high modulus silane modified liquid polymer is polyurethane.

The high modulus silane modified liquid polymer comprises a silane or silyl group, represented by:

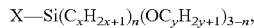

$$X-Si(C_xH_{2x+1})_n(OC_yH_{2y+1})_{3-n},$$

wherein
  n=0, 1 or 2;
  x and y are, independently, integral numbers from 1 to 12 and
  X is a linkage that links the silane to the polymer backbone.

The number of silane groups will preferably be more than at least one per molecule (to generate a fully cured network), and more preferably at least two per molecule. More preferably, the silane functional polymer is end-functionalized, where most or all the ends are silane functional. The number of silyl ether groups per silane end group, 3–n, is preferably 2 or 3 (n=1 or 0).

The high modulus silane modified liquid polymer, herein, is defined as having a Young's modulus of cured neat polymer greater than 50 psi.

Such high modulus silane modified liquid polymers are commercially available, for example, from Momentive Performance Material under the trade name Spur +3100 and Spur +3200, and Henkel under the trade name Flextec.

The amount of high modulus silane modified polymer in the formulation will depend on its molecular weight and functionality, but will typically be from about 5 to about 60 wt %, preferably from about 10 to about 50 wt %, based on the total weight of the adhesive.

The adhesive composition of this invention is tackified. The choice of tackifier will depend on the backbone of the high modulus silane modified polymer. The tackifier choices include natural and petroleum-derived materials ad combinations thereof as described in C. W. Paul, "Hot Melt Adhesives," in Adhesion Science and Engineering-2, Surfaces, Chemistry and Applications, M. Chaudhury and A. V. Pocius eds., Elsevier, New York, 2002, p. 718. Tackifiers serve to reduce the melt viscosity of the adhesives and also can act to compatibilize the polymers in the melt, acting effectively as a solid solvent.

Useful tackifier for the adhesive composition of the invention includes natural and modified rosin, aromatic tackifier or mixtures thereof.

Exemplary natural and modified rosins include gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin. Examples of commercially available rosins and rosin derivatives that could be used to practice the invention include SYLVALITE RE 110L, SYLVARES RE 115, and SYLVARES RE 104 available from Arizona Chemical; Dertocal 140 from DRT; Limed Rosin No. 1, GB-120, and Pencel C from Arakawa Chemical. One preferred natural and modified rosin is a rosin ester tackifier such as KE-100, available from Arakawa Chemical Co. Another preferred rosin ester tackifier is a Komotac 2110 from Komo Resins.

Typical aromatic tackifiers include styrenic monomers, styrene, alpha-methyl styrene, vinyl toluene, methoxy styrene, tertiary butyl styrene, chlorostyrene, coumarone, indene monomers including indene, and methyl indene. Preferred are aromatic hydrocarbon resins that are phenolic-modified aromatic resins, $C_9$ hydrocarbon resins, aliphatic-modified aromatic $C_9$ hydrocarbon resins, $C_9$ aromatic/aliphatic olefin-derived and available from Sartomer and Cray Valley under the trade name Norsolene and from Rutgers series of TK aromatic hydrocarbon resins. More preferred aromatic tackifiers are alpha-methyl styrene types such as Kristalex 3100, Kristalex 5140 or Hercolite 240, all available from Eastman Chemical Co.

The tackifier component will usually be present in an amount of from about 20 wt % to about 60 wt %, more preferably from about 25 wt % to about 45 wt %, even more preferably from about 30 wt % to about 40 wt %, based on the total weight of the adhesive.

The rosin tackifier will typically be included up to about 30 wt %, preferably from about 5 to about 20 wt %, based on the total weight of the adhesive. The aromatic tackifier will typically be included from about 10 to about 60 wt %, preferably from about 15 to about 40 wt %, based on the total weight of the adhesive.

In one embodiment, the ratio of the rosin ester tackifier to the aromatic tackifier will range from about 0.08 to 5.0, and preferably from about 0.3 to about 3.0.

The adhesive further comprises an acrylic polymer. The acrylic polymer provides green strength (uncured strength) to the cooled hot melt adhesive. The acrylic polymer can be either a silane-reactive polymer or non-reactive polymer. Silane reactive groups include carboxylic acid, amine, thiol and hydroxyl. Preferred is carboxylic acid. The number of groups should be sufficient such that a significant amount, at least 5%, of the polymer is grafted via the silane groups. Grafting provides compatibility in the melt phase, before the adhesive is applied and before any reaction with moisture. After bonding and cooling, a phase separated morphology is often preferred as this maximizes the toughness of the adhesive. A phase separated morphology is evidenced by the existence of two glass transition temperatures ($T_g$s) and sometimes also by an increase in opacity upon cooling. The grafted polymer, when using silane reactive polymer, ensures a fine phase separation upon cooling and a tough adhesive. Ideally the silane reactive polymer separates into a solid phase after application and cooling, but is linked to the curing silane polymer phase through the grafted polymer. The amount of solid acrylic polymer in the adhesive will depend on a number factors, including the glass transition temperature and molecular weight of the polymer, but will typically present in an amount of from about 20 to about 45 wt %, based on the total weight of the adhesive.

Preferred is a reactive solid acrylic copolymer containing acid and hydroxyl groups of which Elvacite 2903 from INEOS Acrylics is an example. This material has an acid number 5.2 and hydroxyl number of 9.5.

The reactive hot melt adhesive further comprises a catalyst. Suitable curing agents for the silane groups are described in US 2002/0084030, and incorporated herein. Exemplary catalyst includes bismuth compound such as bismuth carboxylate, organic tin catalyst such as dimethyltin dineodecanoate, dibutyltin oxide and dibutyltin diacetate, titanium alkoxides (TYZOR® types, available from Dupont), tertiary amines such as his (2-morpholinoethyl) ether and triethylene diamine, zirconium complex (KAT XC6212, K-KAT XC-A209 available from King Industries, Inc.), aluminum chelate (K-KAT 5218, K-KAT 4205 available from King Industries, Inc.), and KR types (available from Kenrich Petrochemical, Inc.), and other organic metal, such as Zn, Co, Ni, and Fe and the like. The level of catalyst in the non-MDI reactive adhesive ranges from about 0.05 to about 5 wt %, preferably from about 0.2 to about 3 wt % and most preferably from about 0.5 to about 2 wt %, based on the total weight of the adhesive.

The non-MDI emitting reactive hot melt adhesive may further comprise a low modulus silane modified liquid polymer. The low modulus polymer, herein, is defined as having a Young's modulus of cured neat polymer lower than 50 psi.

The low modulus silane modified liquid polymer, at room temperature, represented by:

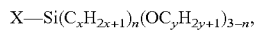

$$X-Si(C_xH_{2x+1})_n(OC_yH_{2y+1})_{3-n},$$

wherein n=0, 1 or 2;

x and y are, independently, integral numbers from 1 to 12 and

X is a linkage that links the silane to the polymer backbone.

The number of silane groups will preferably be more than at least one per molecule (to generate a fully cured network), and more preferably at least two per molecule. More preferably, the silane functional polymer is telechelic, where most or all the ends are silane functional. The number of silyl ether groups per silane end group, 3−n, is preferably 2 or 3 (n=1 or 0). The low modulus silane modified liquid polymer has an organic backbone, bearing one or more terminal or pendant silane or alkoxylated silane groups.

The low modulus silane modified liquid polymer can be prepared in the same manner as the high modulus silane modified liquid polymer. The low modulus silane modified liquid polymer of the present invention may be prepared with a variety of polymer backbones such as polyether, polyester, polyetherester, polyesterether, polyolefin, polycaprolactone, polyacrylate, polybutadiene, polycarbonates, polyacetals, polyester amides and polythioethers, polyolefin and the like. A preferred backbone is a polyether or an acrylate modified polyether (prepared for instance as described in US published application 2002/0084030 A1) such as MAX 951 available from Kaneka Corporation. Silane terminated polyether include linear and/or branched polyether having plural numbers of ether bondings and at least two silyl groups, and contain substantially no functional group other than the silyl groups.

The amount of low modulus silane-functional polymer in the formulation will depend on its molecular weight and functionality, but will typically be included up to 40 wt %, preferably from about 10 to about 30 wt %, based on the total adhesive.

The ratio of the high modulus to low modulus silane modified liquid polymers range from about 0.3 to about 3.

The reactive hot-melt adhesive according to the invention can further comprise conventional additives known to a person skilled in the art. Conventional additives which are compatible with a composition according to this invention may simply be determined by combining a potential additive with the composition and determining if they are compatible. An additive is compatible if it is homogenous within the product. Non-limiting examples of suitable additives include, without limitation, fillers, plasticizers, adhesion promoters, such as compounds containing silanyl groups, anti-oxidants, defoamers, rheology modifiers, flame retardants, paraffin waxes, functionalized wax such as Licocene PP Si 3263 and Licocene PE Si 3661 from Clariant Corp., microcrystalline waxes and hydrogenated castor oil.

The reactive hot melt adhesive optionally comprises a moisture scavenger to extend its pot life, such as vinyl trimethoxy silane or methacryloxypropyltrimethoxysilane. Levels employed can be from 0 to 3% and preferably from 0.5 to 2%. The adhesive optionally comprises an adhesion promoter or coupling agent which promotes bonding to the adherend. Examples are described in: Michel J. Owen, "Coupling agents: chemical bonding at interfaces", in Adhesion Science and Engineering-2, Surfaces, Chemistry and Applications, M. Chaudhury and A. V. Pocius eds., Elsevier, New York, 2002, p. 403. Preferred are organo-silanes which can link the silane-functional polymer to the surface such as amino and epoxy silanes. Levels are 0.01 to 10%, preferably 0.1 to 5% and more preferably 0.2-3%. The adhesion promoter, if more reactive than the silane-functional polymer with moisture, can also serve as a moisture scavenger.

Hot melt adhesives require heat to melt the adhesive in order to apply and wet-out the substrate. Application temperatures are determined by the thermal stability of the formula and the heat sensitivity of the substrates. Preferred application temperatures are below 170° C., more preferably below 150° C., and most preferably below 140° C. Once the adhesive is applied, to adhere articles together, the adhesive composition is subjected to conditions that will allow it to solidify and cure to a composition that has an irreversible solid form. Solidification (setting to the green or uncured state) occurs when the liquid melt is subjected to room temperature. Curing, i.e. chain extending, to a composition that has an irreversible solid form, takes place in the presence of ambient moisture.

The invention is further illustrated by the following non-limiting examples.

Examples

List of Components

MAX 951 is a silane terminated polyether, commercially available from Kaneka Corp.

Spur+ 3200 is a silane terminated polyurethane, commercially available from Momentive Performance Materials.

Flextec 16042008 is a silane terminated polyurethane, commercially available from Henkel KBG.

DMDEE is a bis (2-morpholinoethyl) ether from VWR Inc.

Resiflow LF is a rheology modifier (anti-foaming agent) commercially available from Estron Chemical.

Elvacite 2903 is a solid acrylic polymer, commercially available from Lucite Corp.

KE-100 is a hydrogenated rosin ester, commercially available from Arakawa Chemical Co.

Kristalex 3100 is an alpha-methyl styrene tackifier, commercially available from Eastman Chemical Co.

Komotac 2110 is a partially hydrogenated rosin ester, commercially available from Komo Resins.

Silquest A-174 is a moisture scavenger, commercially available from Momentive Performance Materials.

Silquest A1110 is an adhesion promoter, commercially available from Momentive Performance Materials.

Fomrez SUL-11A is a catalyst (50:50 mixture of dibutyltin oxide with dibutyl phthalate), commercially available from Chemtra Corp.

Reaxis C233 is a dibutyltin diacetate from Reaxis Inc.

The Table 1 lists the Young's modulus of several neat silane modified liquid polymers. Samples were prepared by mixing 20.0 g of each silane modified liquid polymer with 0.2 g of Fomez SUL-11A and 0.1 g of DMDEE for about 15 minutes. The samples were then set in a silicone mold that had a dumbbell shape. The dumbbell had two 1"×1" wide end tabs connected by a ½"×½" wide gage section. The thickness of the dumbbell samples were ⅛" thickness. After the samples were set, Young's modulus was measured on Sintec 1-D at a pulling rate of 12"/min. The resultant modulus is reported in Table 1.

TABLE 1

Young's modulus of neat silane modified liquid polymer after cure.

| Neat Silane modified liquid polymer | Young's modulus |
|---|---|
| MAX 951 | 26 |
| Spur +3200 | 1700 |
| Flextec 16042008 | 108.9 |

Table 1 indicates that Max 951 has a Young's modulus less than 50 psi. Spur +3200 and Flextec 16042008 have a Young's modulus value greater than 50 psi.

Table 2 lists the components and performance of the prepared inventive adhesive and comparative samples. To prepare the adhesive, rheology modifier, acrylic polymer and tackifier(s) were combined in a container and heated at 305° F. and stirred until it became a homogeneous mixture. Vacuum was then applied to the mixture to remove any water and the temperature was lowered to 240° F. When the set point of the mixture became about 240° F., silane modified polymer(s) was added and mixed into the container, under heat and vacuum for additional 30 minutes. The rest of the components were then added and mixed into the container, still under heat and vacuum for additional 15 minutes, to form an adhesive sample. The adhesive was then poured into a different container, sealed under nitrogen and cooled to room temperature.

To measure the modulus and % elongation at break of cured adhesive, film samples were prepared. The adhesives were heated to a molten state at 250° F., and a film thickness of 0.030" was drawn with a stainless steel drawdown applicator (BYK-Gardner) on a Teflon plate. The film was then cured for 7 days at 23° C. and 50% relative humidity. Dogbone shape samples were cut from the film in accordance with ASTM D638, Type IV. The samples were tested on Sintec 1-D Instron machine (MTS Sintech) by pulling at 12 inches/min, with the initial distance between the grips set at 2.5 inches. Young's modulus and % elongation values at break were recorded for each sample film and are reported in Table 2.

Open time of the adhesive was also measured for each sample. Each adhesive was heated to a molten state at 250° F. A 0.01" thickness film was cast on a wooden board with a stainless steel drawdown applicator (BYK-Gardner). Immediately thereafter, short strips of paper (0.625" wide by 4.25" long) were pressed onto adhesive film. The strips were then peeled off. Time difference, from the when the paper was applied to when the fiber tear could no longer be achieved, was then measured and reported in Table 2 as open time.

It is desirable for adhesive application to have cured adhesive Young's modulus more than 3000 psi, percent elongation at break more than 300%, and open time from 10 to 25 seconds.

Table 2 lists adhesive formulations and performance properties with different silane modified polymers. Batch 1 used high modulus silane modified polymer Spur+ 3200 only, batch 2 and batch 3 use combination of high modulus silane modified polymer and low modulus silane modified polymer. Comparative example A and B used low modulus silane modified polymer MAX 951 only.

TABLE 2

Reactive Adhesive Samples

| | 1 (wt %) | 2 (wt %) | 3 (wt %) | Comparative A (wt %) | Comparative B (wt %) |
|---|---|---|---|---|---|
| Components | | | | | |
| MAX 951 | | 19.33 | 9.67 | 38.66 | 38.66 |
| Spur +3200 | 38.66 | 19.33 | | | |
| Flextec 16042008 | | | 29.00 | | |
| Resiflow LF | 0.39 | 0.39 | 0.39 | 0.39 | 0.39 |
| Elvacite 2903 | 29.00 | 29.00 | 29.00 | 29.00 | 29.00 |
| Kristalex 3100 | 21.82 | 21.82 | 21.82 | 25.41 | 14.50 |
| Komotac 2110 | 7.18 | 7.18 | 7.18 | 3.59 | 14.50 |
| Silquest A-174 | 0.83 | 0.83 | 0.83 | 0.83 | 0.83 |
| Silquest A1110 | 1.16 | 1.16 | 1.16 | 1.16 | 1.16 |
| Fomrez SUL-11A | 0.97 | 0.97 | | 0.97 | 0.97 |
| Reaxis C233 | | | 0.97 | | |
| Performance | | | | | |
| Young's modulus (psi) | 10311 | 3486 | 5390 | 1017 | 1400 |
| Elongation at break (%) | 349 | 823 | 742 | 394 | 906 |
| Open time (sec) | 15 | 24 | 25 | 10 | 3 |

Batches 1-3 have cured adhesive modulus greater than 3000 psi, elongation at break value greater than 300%. Also, the sample adhesives have open time of 15 to 25 seconds. On the other hand, comparative samples A and B have cured modulus less than 3000 psi and shorter open time than required value.

It has been found that the use of a specific type and ratio of tackifiers affect the open time of the reactive adhesives with silane modified liquid polymer.

Table 3 lists three samples, varying only the type and ratio of the tackifiers demonstrate its affect on the adhesive's open time.

TABLE 3

Affect of Tackifiers

| | 4 ratio | 5 ratio | 6 ratio |
|---|---|---|---|
| Tackifier component | | | |
| Kristalex 3100 | 1 | 2 | 3.04 |
| Komotac 2110 | 1 | 1 | 1 |
| Performance | | | |
| Cured adhesive modulus (psi) | 3700 | 10500 | 12000 |
| Elongation at break (%) | 800 | 550 | 408 |
| Open time (sec) | 45 | 20 | 5 |

As shown in Table 3, the ratio of the aromatic to rosin ester affect the adhesive's open time. Even if the cured modulus and elongation at break are sufficient, open time of the adhesive may be deficient to be useful for adhesive application.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A reactive hot melt adhesive comprising:
    from about 10 to about 50 wt % of a high modulus silane modified liquid polymer having a backbone prepared from polyurethane, polyether, polyester, polyetherester, polyesterether, polyolefin, polycaprolactone, polybutadiene, polycarbonate, polyacetal, polyester amide, polythioether;
    from about 10 to about 30 wt % of a low modulus silane modified liquid polymer having a backbone prepared from polyurethane, polyether, polyester, polyetherester, polyesterether, polyolefin, polycaprolactone, polybutadiene, polycarbonate, polyacetal, polyester amide, polythioether;
    from about 20 to about 60 wt % of a tackifiers selected from the group consisting of rosin ester, aromatic tackifier or mixtures thereof;
    from about 20 to about 45 wt % of a silane reactive acrylic polymer; and
    from about 0.5 to about 5 wt % of a catalyst
    wherein the Young's modulus of cured high modulus silane modified polymer is greater than 50 psi and the sum of the total adhesive is 100 wt %.

2. The reactive hot melt adhesive of claim 1, wherein the high modulus silane modified liquid polymer has a silyl group with a formula of $X-Si(C_xH_{2x+1})_n(OC_yH_{2y+1})_{3-n}$, wherein
    X is a linkage to a polymer backbone;
    x is 1 to 12;
    y is 1 to 12; and
    n is 0, 1 or 2.

3. The reactive hot melt adhesive of claim 2, wherein the silyl group of the high modulus silane modified liquid polymer is end-functionalized.

4. The reactive hot melt adhesive of claim 2, wherein the high modulus silane modified liquid polymer backbone is a polyurethane, polyether, polyester, or polyolefin.

5. The reactive hot melt adhesive of claim 2, wherein the high modulus silane modified liquid polymer backbone is a polyurethane.

6. The reactive hot melt adhesive of claim 1, wherein the tackifier is a rosin tackifier and is selected from the group consisting of fully or partially hydrogenated rosin esters.

7. The reactive hot melt adhesive of claim 1, wherein the tackifier is an aromatic tackifier and is selected from the group consisting of alpha-methyl styrene resins, $C_9$ hydrocarbon resins, aliphatic-modified aromatic $C_9$ hydrocarbon resins, phenolic-modified aromatic resins, $C_9$ aromatic/aliphatic olefin-derived resins, and mixtures thereof.

8. The reactive hot melt adhesive of claim 1 wherein the tackifier is a mixture of a rosin ester tackifier and aromatic tackifier, and wherein the weight ratio of the rosin ester to the aromatic tackifier is from about 0.05 to about 5.

9. The reactive hot melt adhesive of claim 8 wherein the weight ratio of the rosin ester tackifier to the aromatic tackifier is from about 0.3 to about 3.

10. The reactive hot melt adhesive of claim 1, wherein the low modulus silane modified liquid polymer has a silyl group with a formula of $X-Si(C_xH_{2x+1})_n(OC_yH_{2y+1})_{3-n}$, wherein
    X is a linkage to a polymer backbone;
    x is 1 to 12;
    y is 1 to 12; and
    n is 0, 1 or 2.

11. The reactive hot melt adhesive of claim 10, wherein the low modulus silane modified liquid polymer backbone is a polyether, acrylate modified polyether, polyester, polyurethane or polyolefin.

12. The reactive hot melt adhesive of claim 10, wherein the low modulus silane modified liquid polymer backbone is a polyether.

13. The reactive hot melt adhesive of claim 10, wherein the weight ratio of the high modulus silane modified liquid polymer to the low modulus silane modified liquid polymer is from about 0.3 to about 3.0.

14. The reactive hot melt adhesive of claim 1 comprising:
    from about 10 to about 30 wt % of the high modulus silane modified liquid polymer;
    from about 10 to about 30 wt % of the low modulus silane modified liquid polymer;
    from about 5 to about 20 wt % of a rosin or rosin ester tackifier; and
    from about 15 to about 40 wt % of an aromatic tackifier.

15. An article of manufacture comprising the adhesive of claim 1.

16. The article of claim 15 which comprises paper or paperboard.

17. The article of claim 16 which is a book.

18. The reactive hot melt adhesive of claim 1, wherein the acrylic polymer comprises at least one of carboxylic acid groups, amine groups, thiol groups and hydroxyl groups.

19. The reactive hot melt adhesive of claim 1, wherein the acrylic polymer comprises carboxylic acid groups and hydroxyl groups.

* * * * *